United States Patent [19]

Kaneko et al.

[11] Patent Number: 5,159,248

[45] Date of Patent: Oct. 27, 1992

[54] POSITION DETECTING APPARATUS

[75] Inventors: Kiyotaka Kaneko; Minoru Arai, both of Tokyo, Japan

[73] Assignee: Fuji Photo Film Co., Ltd., Kanagawa, Japan

[21] Appl. No.: 757,014

[22] Filed: Sep. 9, 1991

[30] Foreign Application Priority Data

Sep. 28, 1990 [JP] Japan .................. 2-257014

[51] Int. Cl.$^5$ ............................................. G05B 11/01
[52] U.S. Cl. ..................................... 318/560; 318/626
[58] Field of Search .................. 318/560, 626, 568.16; 359/696, 697, 698; 355/55, 56

[56] References Cited

U.S. PATENT DOCUMENTS 4,401,930 8/1983 Kato et al. ...................... 318/626 X Primary Examiner—William M. Shoop, Jr.
Assistant Examiner—Karen Masih

[57] ABSTRACT

A mechanism for moving an object rectilinearly by reducing the speed of motor rotation and converting this rotational motion into rectilinear motion is provided with a first sensor for generating first pulses having a frequency conforming to the rotational speed of the motor, a second sensor for generating second pulses having a frequency conforming to the reduced rotational speed and a pulse interval which is n times that of the first pulses, and third sensor for generating a third output when the object arrives at a predetermined position. A counter is initialized when the first pulse, second pulse and third output satisfy a predetermined condition. Depending upon the direction in which the object is moved, the first pulses are counted up or down by counter. Whenever the second pulses are generated, the count recorded in the counter is forcibly corrected to the value of $n \times m$ (where m is 0 or an integer) that is closest to the count.

2 Claims, 4 Drawing Sheets

POSITION DETECTING APPARATUS

BACKGROUND OF THE INVENTION

1. Field of the Invention

This invention relates to an apparatus for detecting the position of an object which undergoes rectilinear motion, such as the imaging lens of a camera.

2. Description of the Related Art

In order to adjust the focal point automatically in an AF (automatic focusing) camera, it is necessary for the imaging lens of the camera to be moved to any position. The same is true for the zoom lens in a camera possessing a zoom function. The drive system for moving the lens is constituted by a motor, a speed reduction mechanism which includes gears, a mechanism for converting the rotational motion of the motor into rectilinear motion and so on. However, an unavoidable problem is the fact that some error in lens position develops from the inertia possessed by these mechanisms, their precision, which includes play, and external forces acting upon the mechanisms. This error accumulates with repeated forward rotation, stopping and reverse rotation of the motor.

SUMMARY OF THE INVENTION

An object of the present invention is to provide a position detecting apparatus capable of preventing the accumulation of error in the detection of the position of a moving object, thereby making it possible to detect the position accurately at all times.

According to the present invention, the foregoing object is attained by providing a position detecting apparatus which comprises rotative drive means; speed reducing means for reducing the speed of a rotative output produced by the rotative drive means; direction converting means for converting a rotative output produced by the speed reducing means into rectilinear motion of an object; first sensor means for outputting first pulses having a frequency conforming to the rotational speed of the rotative output produced by the rotative drive means; second sensor means for outputting second pulses having a frequency conforming to the rotational speed of the rotative output produced by the speed reducing means and a pulse interval which is n times that of the first pulses; third sensor means for generating a third output when an object undergoing rectilinear motion arrives at a predetermined position; counting means for reversibly counting the outputted first pulses in dependence upon a direction of movement of the object, and representing the position of the object by the value of the resulting count; means using, as a reference, a position at which the outputted first pulses, the outputted second pulses and the third output satisfy a predetermined condition, for initializing the value of the count in the counting means when the predetermined condition is satisfied; and correcting means responsive to the outputted second pulses for normalizing the value of the count in the counting means using the value of n×m (where m is a positive or negative integer, inclusive of 0).

In accordance with the invention, the position of the object is represented by the value of the count obtained by reversibly counting the first pulses. Since the first pulses have a frequency conforming to the rotational speed of the rotative output from the rotative drive means before the speed reduction is applied, a large number of the first pulses are produced even when the object undergoes slight displacement, and therefore it is possible to perform accurate position detection with a high resolution. However, the higher the resolution, the more difficult it is to avoid an error from developing between the actual position of the object and the count of the first pulses. If this error accumulates, a large error is likely to be produced. According to this invention, the second pulses, which have a frequency conforming to the rotational speed of the rotative output following an application of the speed reduction by the speed reducing means, are used for a positional correction. The count of the second pulses corresponds to the higher digits of the count of the first pulses. Where n represents the ratio of the first pulses to the second pulses that arises from the speed reduction performed by the speed reducing means, according to the invention, the count of the first pulses is normalized using the value of n×m (where m is an integer) each time a second pulse is generated. As a result, it is possible to prevent the accumulation of error that easily develops in the count of the first pulses. Since the position of the object is expressed by counting the first pulses throughout, the accuracy of positional detection is maintained at a high level.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

Figure 1:
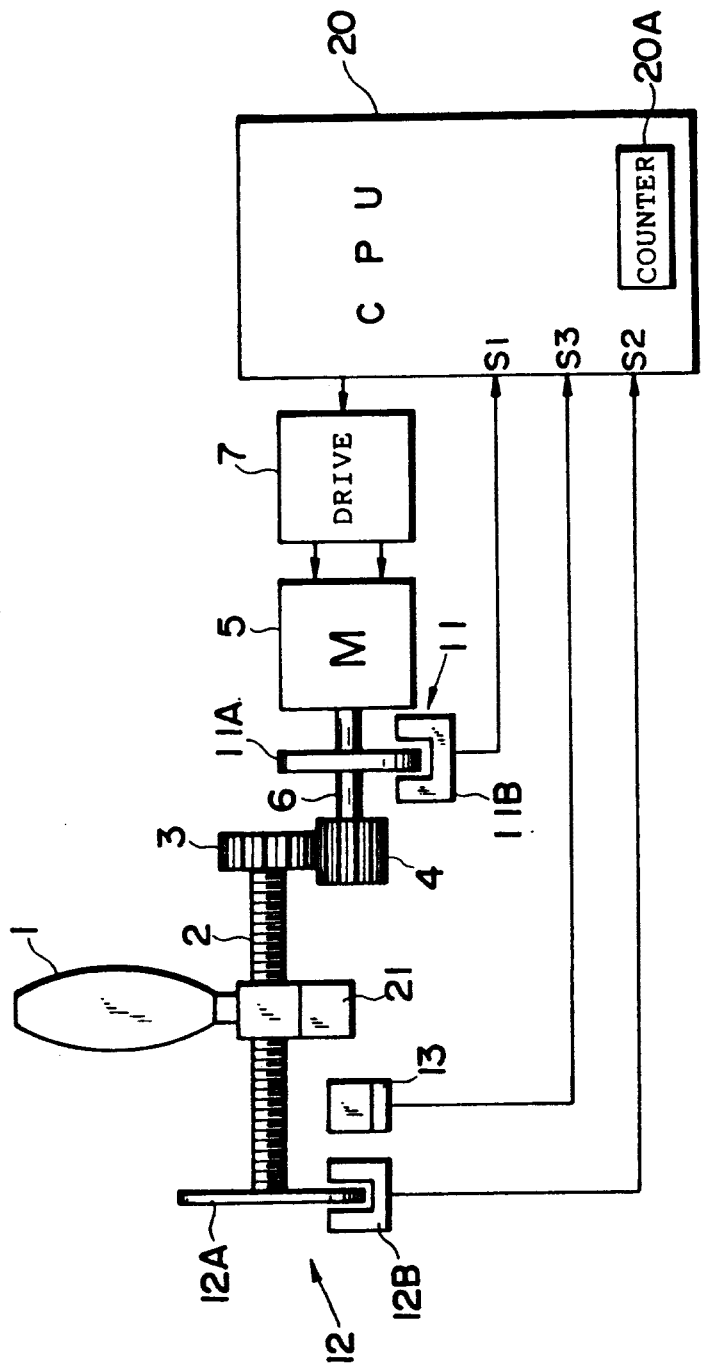
FIG. 1 is a structural view showing the drive system of an imaging lens.
Figure 2:
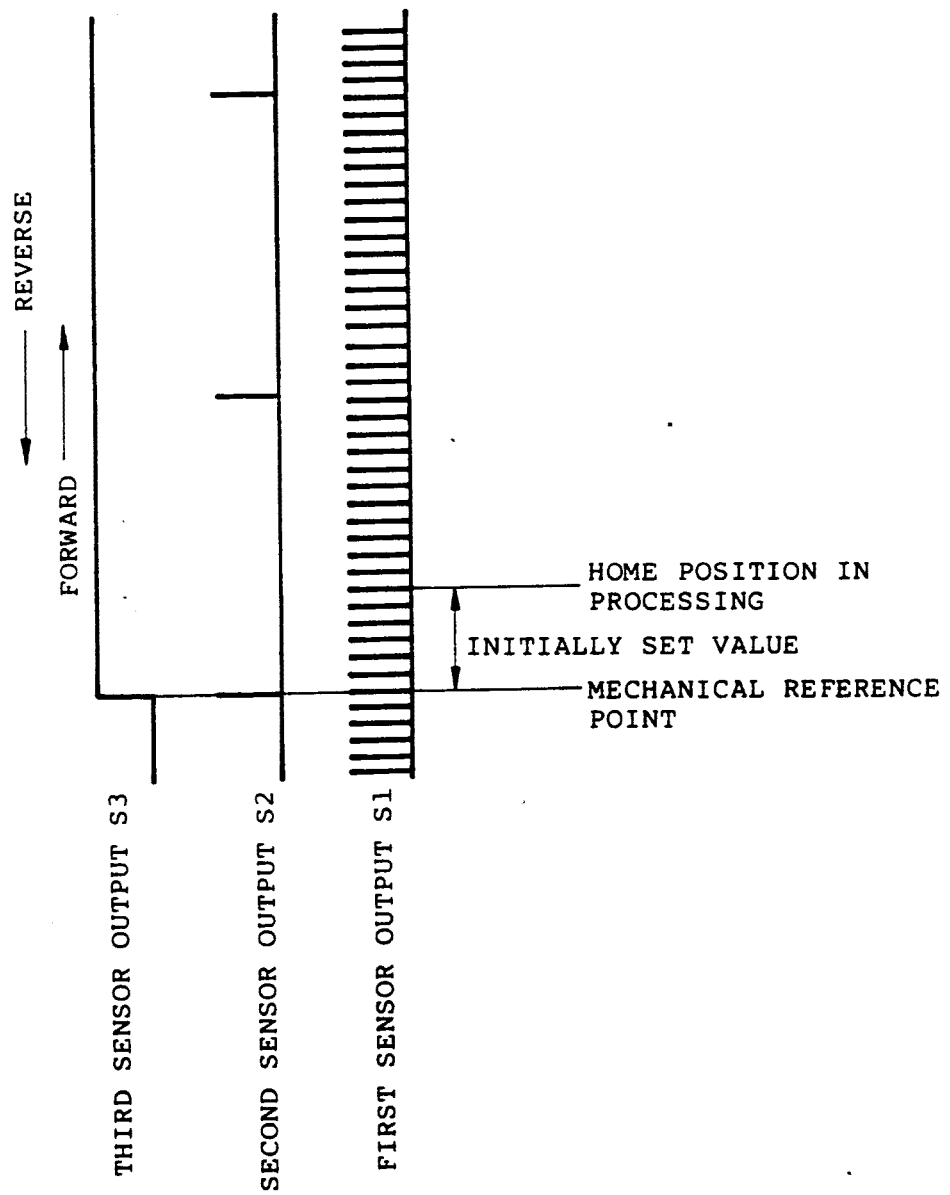
FIG. 2 is a waveform diagram showing output signals produced by sensors included in the drive system of the imaging lens.

FIG. 1 is a structural view illustrating an embodiment of the present invention and showing the drive system of the imaging lens of a camera. FIG. 2 is a waveform diagram representing the outputs of sensors included in the drive system of the imaging lens shown in FIG. 1.

As shown in FIG. 1, an imaging lens (an object) 1 is supported on a movable body 21. The movable body 21 has an inner surface formed to include inner teeth or a spiral groove. The inner surface of the movable body 21 is in mesh with a screw shaft or a spiral shaft (drive shaft) 2. When the drive shaft 2 rotates, the movable body 21 is moved to the left or right in FIG. 1, and this is accompanied by leftward and rightward movements of the imaging lens 1. The movable body 21 and the drive shaft 2 construct a mechanism for converting rotational motion into rectilinear motion. The movable body 21 is guided so as to be unrotatable and axially movable free of the drive shaft 2.

Fixedly secured to the right end of the drive shaft 2 is a first gear 3 meshing with a second gear 4 fixedly secured to a rotary shaft 6 of a DC motor (or stepping motor) 5. The first and second gears 3 and 4 construct a speed reducing mechanism, in which the rotation of the DC motor 5 is transmitted to the drive shaft 2 upon being reduced in speed.

The rotational speed of the DC motor 5 is detected by a first sensor 11. The first sensor 11 is a rotation transducer including a rotary disk 11A fixedly secured to the drive shaft 6 of the DC motor 5 and formed to have slits at prescribed angular intervals, and a transmissive.type photoelectric sensor 11B arranged so as to embrace the disk 11A. The first sensor 11 generates a pulse signal S1 having a frequency proportional to the rotational speed of the DC motor 5. The pulse-signal S1 is applied to a CPU 20.

The rotational speed of the drive shaft 2 is detected by a second sensor 12. The second sensor 12 also is a rotation transducer comprising including a rotary disk 12A fixedly secured to the drive shaft 2, and a photoelectric sensor 12B. The second sensor 12 outputs a pulse signal S2 having a frequency proportional to the rotational speed of the drive shaft 2. The pulse signal S2 also is applied to the CPU 20. The pulse interval of the pulse signal S2 is greater than that of the pulse signal S1. The pulse-interval ratio n of the pulse signal S1 to the pulse signal S2 is decided by the speed-reduction ratio of the speed reducing mechanism and the ratio of the resolution of first sensor 11 to that of the second sensor 12. In this embodiment, the ratio n is assumed to be 40. More specifically, 40 pulses of the signal S1 are generated in one period of the signal S2.

A third sensor 13 for detecting the position of the movable body 21 is arranged in the vicinity of the left end of drive shaft 2. The sensor 13 also includes a photoelectric sensor and produces an output signal S3 which assumes the L level when the movable body 21 is detected. Accordingly, as shown in FIG. 2, the output signal S3 of the third sensor 13 is at the L level only when the movable body 21 is near the left end of the drive shaft 2 and the signal S3 is at the high level over most of the range of movement of movable body 21. The signal S3 also is applied to the CPU 20.

Based upon the input signals S1, S2 and S3 from the respective first, second and third sensors 11, 12 and 13, the CPU 20 detects the position of the movable body 21, namely the position of the imaging lens 1, as will be described later, drives the DC motor 5 based upon the sensed position, and positions the imaging lens 1 at a desired position. The CPU 20 is equipped with a reversible counter 20A. The latter counts the output pulses S1 from the first sensor 11. When the DC motor 5 rotates in the forward direction (in response to which the lens 1 moves rightward in FIG. 1), the pulses S1 are counted up. Conversely, when the DC motor 5 rotates in the reverse direction (in response to which the lens 1 moves leftward in FIG. 1), the pulses S1 are counted down. In a case where the pulse signal S1 from the first sensor 11 shown in FIG. 2 is a single pulse that does not possess a direction property, whether the reversible counter 20A is counted up or counted down is controlled by the CPU 20 in dependence upon whether the CPU 20 rotates the motor DC 5 in the forward or reverse direction. In a case where the pulse signal S1 outputted by the first sensor 11 has two.phase pulses possessing a direction property, it is possible to control the up/down counting operation of the reversible counter 20A in dependence upon the forward/reverse direction expressed by the two.phase pulses. The reversible counter 20A may be one constituted by hardware or one implemented by using a predetermined area of a memory as a counter. In either case, the position of the imaging lens 1 is expressed by the value of the count recorded by the counter 20A.

Figure 3:
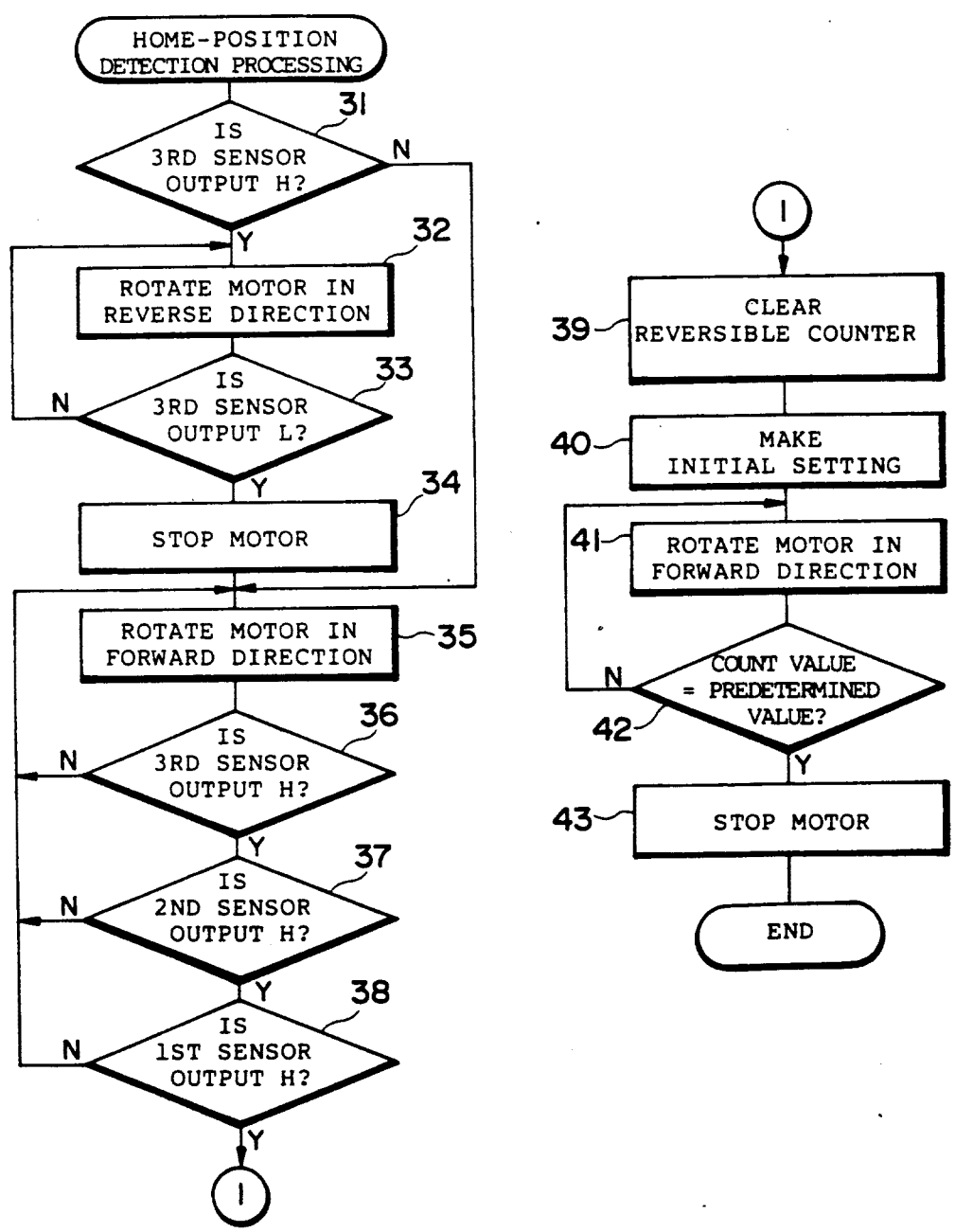
FIG. 3 is a flowchart illustrating the processing for detecting a home position.

FIG. 3 illustrates a processing procedure executed by the CPU 20 for detecting a home position.

First, it is determined at step 31 whether the output signal S3 of the third sensor 13 is at the H level or L level. When the signal S3 is at the H level, the DC motor 5 is rotated in the reverse direction to move the movable body 21 leftward until the signal S3 assumes the L level (steps 32-34). If the signal S3 is at the L level, this means that the movable body 21 is located at the left end, and therefore the processing of steps 32-34 is not executed.

The drive system of the imaging lens shown in FIG. 1 has a mechanical reference point. Specifically, when the DC motor 5 is rotated forwardly to move the movable body 21 rightward after the movable body 21 has been moved to the left end, the position at which the output pulse signals S1, S2 from the first and second sensors 11, 12 and the output signal S3 from the third sensor 13 first attain the H level in unison is adopted as the mechanical reference point. This reference point is detected through the processing of steps 35-38.

When the mechanical reference point is detected, the reversible counter 20A is cleared, and therefore the value of the reversible count recorded by the counter 20A becomes 0 at step 39.

Though the mechanical reference point can be adopted as the home position for the sake of processing to control the position of the imaging lens 1, in this embodiment a position that is a prescribed distance to the right of the mechanical reference point is adopted as the home position in position control processing. In order to bring the movable body 21 (the imaging lens 1) to the home position in terms of processing, a predetermined value (the number of pulses in signal S1 equivalent to the distance from the mechanical reference point to the home position in processing) is set in a predetermined area of a memory at step 40, and the motor 5 is rotated forwardly at step 41. In response to a forward rotation of the DC motor 5, the count in the reversible counter 20A is incremented, i.e., counted up. When the count in counter 20A has become equal to the aforementioned predetermined value at step 42, the DC motor 5 is stopped at step 43. As a result, the movable body 21 (lens 1) is positioned at the home position for processing.

Figure 4:
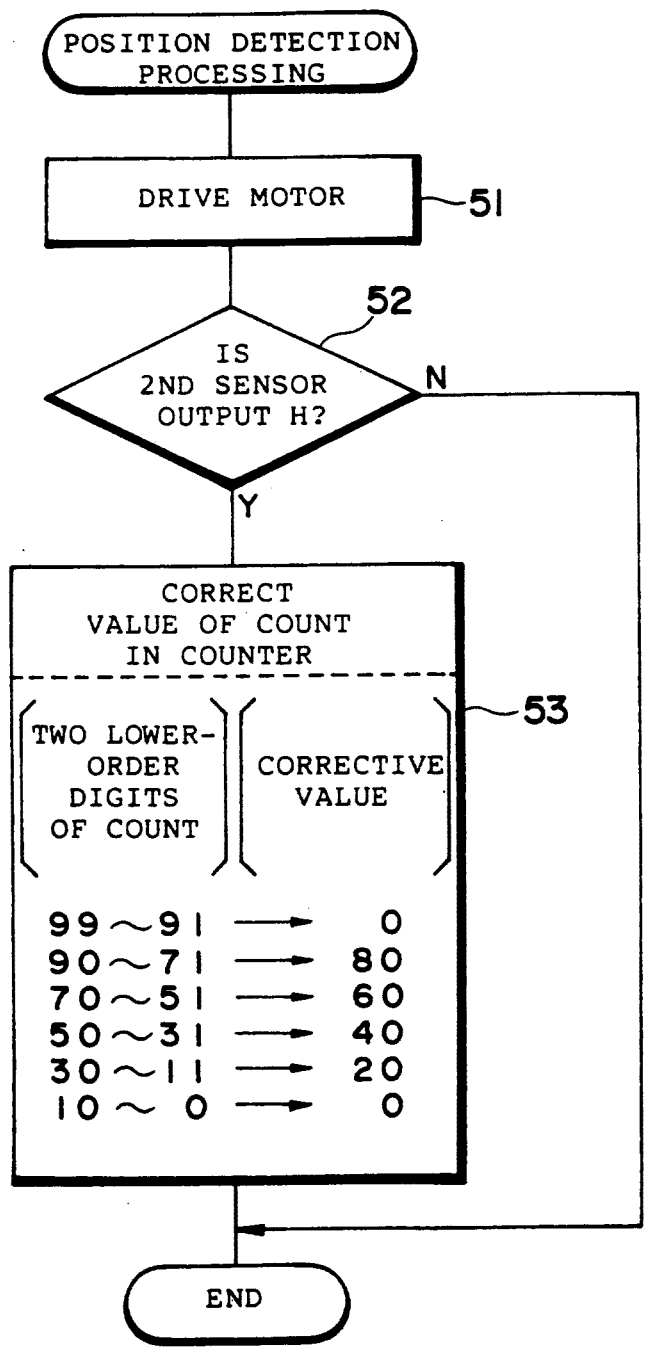
FIG. 4 is a flowchart illustrating the processing for detecting a position.

FIG. 4 illustrates the position detecting processing executed by the CPU 20. The position of the movable body 21 (lens 1) is indicated by the count in the reversible reversible counter 20A, as set forth above. The counter 20A counts up the pulses S1 when the DC motor 5 rotates forwardly and counts down the pulses S1 when the DC motor rotates reversely. While this up/down counting operation is being repeated, an error, which is due to the mechanical clearance of the drive system as well as to other factors, develops between the actual position of the movable body 21 and the position indicated by the count in the reversible counter 20A, and this error may accumulate.

The processing for detecting a position is adapted to eliminate such accumulation of error, and the pulse signal S2 outputted by the second sensor 12 is used to accomplish this. As mentioned earlier, one pulse S2 is generated in one direction of the movable body 21 for every 40 (n-number) of the pulses S1 generated by the first sensor 11. In addition, the reversible counter 20A has been cleared when the pulse signal S2 is at the H level. Accordingly, normalization processing is executed in which, when the pulse signal S2 enters the CPU 20 and, at such time, the count in the reversible counter 20A contains a fraction, this fraction is forcibly replaced by a number which is a whole number multiple m (which may be 0 or a positive integer in this embodiment) of 40 (i.e., n).

When the DC motor 5 is rotated in the forward or reverse direction at step 51, the CPU 20 observes the two lower.order digits of the count in the reversible counter 20A which prevails at the moment the second sensor 12 generates the H-level output signal S2 at step 52, and the CPU 20 forcibly corrects the value of the two lower-order digits by a value, which is a whole-number multiple of 40, that is nearest to the value of the two lower-order digits. Values which are whole-number multiples of 40 are 0, 40, 80, 120, 160, 200, etc., among which the two lower.order digits 0, 20, 40, 60, 80, 0 are adopted as corrective values. For example, if the value of the count in counter 20A is 1536, then the value 36 of the two lower-order digits is replaced by the corrective value 40, which is nearest 36, for thereby correcting the count in the reversible counter 20A. Thus, accumulation of an error is prevented since fractions in the count recorded by the reversible the reversible counter 20A are adjusted whenever the output pulse S2 is generated by the second sensor 12.

As many apparently widely different embodiments of the present invention can be made without departing from the spirit and scope thereof, it is to be understood that the invention is not limited to the specific embodiments thereof except as defined in the appended claims.

What is claimed is:

1. A position detecting apparatus comprising rotative drive means:

speed reducing means for reducing the speed of a rotative output produced by said rotative drive means;

direction converting means for converting a rotative output produced by said speed reducing means into rectilinear motion of an object;

first sensor means for outputting first pulses having a frequency conforming to the rotational speed of the rotative output produced by said rotative drive means;

second sensor means for outputting second pulses having a frequency conforming to the rotational speed of the rotative output produced by said speed reducing means and a pulse interval which is n times that of the first pulses;

third sensor means for generating a third output when an object undergoing rectilinear motion arrives at a predetermined position;

counting means for reversibly counting the outputted first pulses in dependence upon direction of movement of the object, and indicating the position of the object by the value of the resulting count;

means using, as a reference, a position at which the outputted first pulses, the outputted second pulses and the third output satisfy a predetermined condition, for initializing the value of the count in said counting means when the predetermined condition is satisfied; and correcting means responsive to the outputted second pulses for normalizing the value of the count in said counting means using the value of n × m (where m is a positive or negative integer, inclusive of 0).

2. A method of detecting position in a movement drive mechanism having rotative drive means, speed reducing means for reducing the speed of a rotative output produced by said rotative drive means, and direction converting means for converting a rotative output produced by said speed reducing means into rectilinear motion of an object; comprising the steps of:

outputting first pulses by first sensor means having a frequency conforming to the rotational speed of the rotative output produced by said rotative drive means;

outputting second pulses by sensor means having a frequency conforming to the rotational speed of the rotative output produced by said speed reducing means and a pulse interval which is n times that of the first pulses;

generating a third output by third sensor means when an object undergoing rectilinear motion arrives at a predetermined position;

reversibly counting the outputted first pulses by counting means in dependence upon direction of movement of the object;

initializing the value of a count in said counting means when a predetermined condition is satisfied by, using as a reference a position at which the outputted first pulses, the outputted second pulses and the third output satisfy predetermined condition, and correcting the value of the count in said counting means by the value of n × m (where m is a positive or negative integer, inclusive of 0), in response to the outputted second pulses.

* * * * *